Jan. 5, 1932.   H. J. LUDEWIG   1,840,240
BATTERY SUPPORT AND CONNECTION
Filed July 27, 1929   2 Sheets-Sheet 1
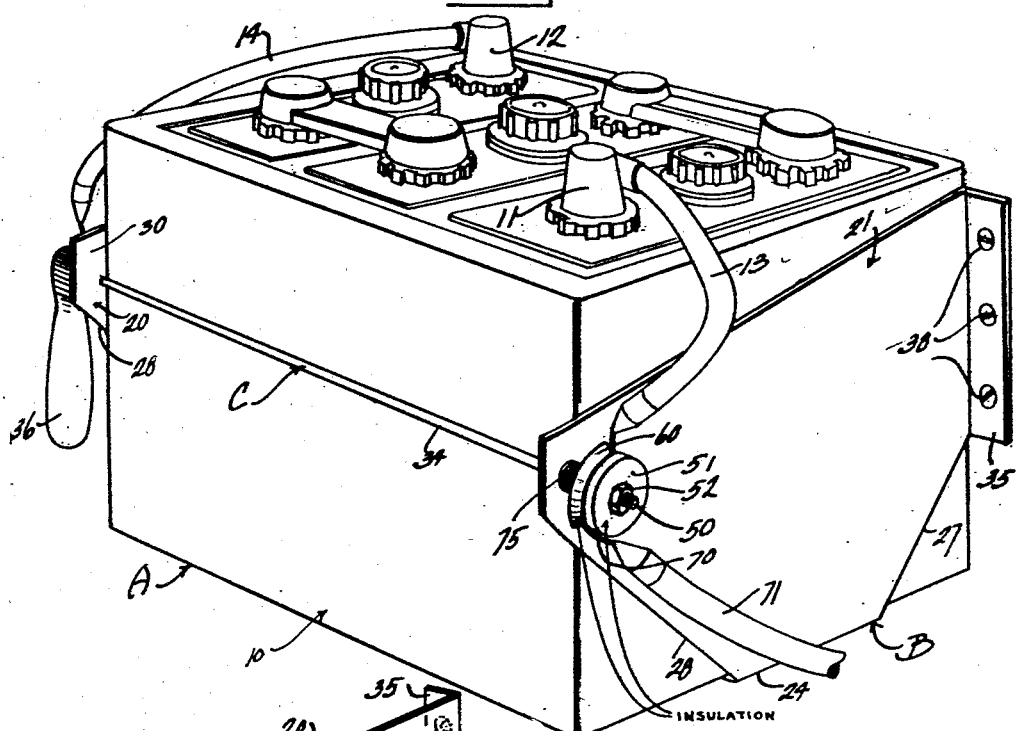
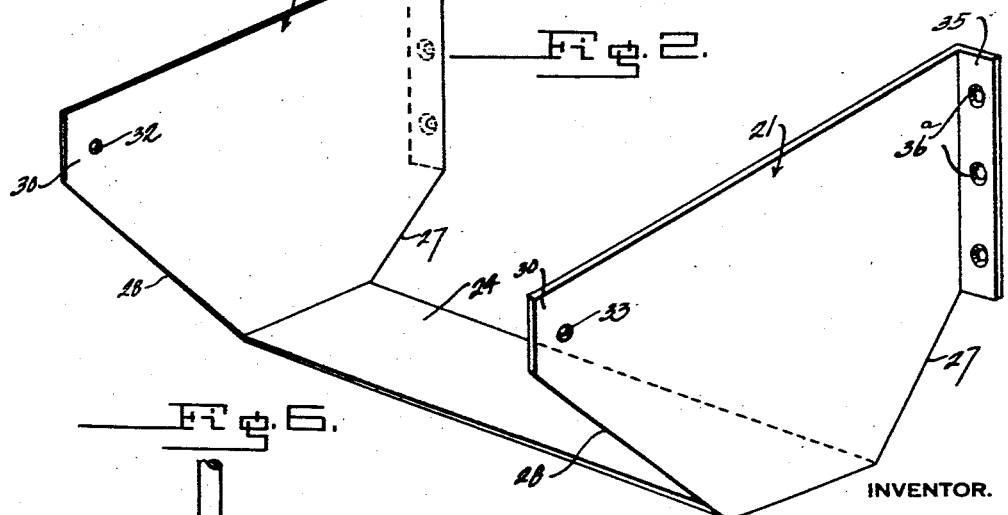
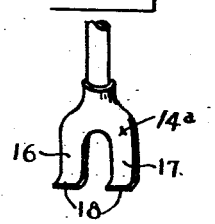
INVENTOR.
Hercel J. Ludewig
BY Lancaster and Allwine
ATTORNEYS.

Jan. 5, 1932.    H. J. LUDEWIG    1,840,240
BATTERY SUPPORT AND CONNECTION
Filed July 27, 1929    2 Sheets-Sheet 2

INVENTOR.
Hercel J. Ludewig
BY Lancaster and Allwine
ATTORNEYS.

Patented Jan. 5, 1932

1,840,240

UNITED STATES PATENT OFFICE

HERCEL J. LUDEWIG, OF PITTSVILLE, WISCONSIN

BATTERY SUPPORT AND CONNECTION

Application filed July 27, 1929. Serial No. 381,662.

This invention relates to improvements in storage batteries and means for supporting the same.

The primary object of this invention is the provision of a storage battery having means to efficiently mount the same upon a vehicle, or any approved support, where desired, for quick change.

A further object of this invention is the provision of an improved expansible container for receiving a storage battery therein, with means to contract the same into holding relation with a battery. A further object of this invention is the provision of improved means for connecting the posts of a battery in a circuit, with the terminals sufficiently spaced from the battery posts, so that they cannot become corroded, and may be quickly detached to permit removal of the battery.

Other objects and advantages of this invention will be apparent during the course of the following detailed description.

In the drawings, wherein for the purpose of illustration is shown only a preferred embodiment of the invention, Figure 1 is a perspective view showing the improved storage battery supporting bracket and quickly detachable connection for the terminals thereof.

Figure 2 is a perspective view of the bracket for a storage battery.

Figure 6 is a perspective view of one of the terminal clips.

Figure 3:
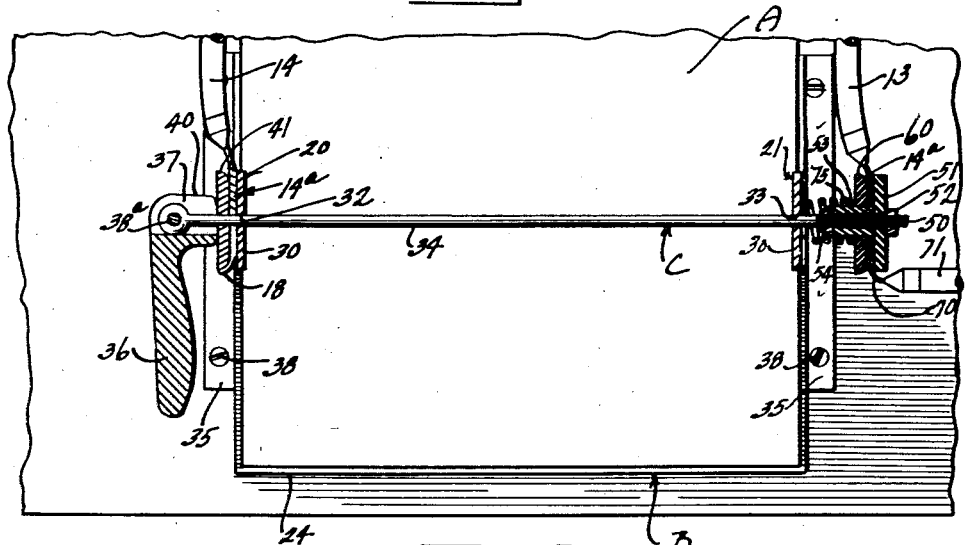
Figure 3 is a transverse sectional view taken through the terminal connected clamping devise of the improvement.

In the drawings, wherein similar reference characters designate corresponding parts throughout the several views, the letter A may generally designate a storage battery of any approved type, supported by the container-like bracket B, and having improved means C associated therewith for terminal connection detachment in the ignition system of the vehicle, or other circuit with which the battery is associated.

The battery A comprises the casing 10, of polygonal formation including bottom, side and end walls, and on the top of which the usual positive and negative posts 11 and 12 are provided, having permanently attached conducting cables 13 and 14 connected therewith, which are relatively short, and at their opposite ends are provided with bifurcated terminals 14ª, shown more particularly in Figure 6 of the drawings, having electrical connection through the wires of the cables with the posts of the battery. The cables 13 and 14 are never intended to be detached from the battery, but are a permanent part thereof, and suitably connected by insulation against corrosion. They present no joints adjacent the posts, which would likely prove an inefficient connection due to corrosion. The short conducting cables 13 and 14 have the prong portions 16 and 17 of their terminals 14ª arcuated in one direction at their free ends, as shown at 18, for a purpose to be subsequently mentioned.

The container B is of sheet metal, or any other approved material, comprising side walls 20 and 21, in spaced parallel planes, connected at their lower edges by a right angled bottom cross brace 24 on which the battery rests. The walls 20 and 21 are convergent at 27 and 28 at opposite ends thereof, downwardly, and extend to a location at the front and rear edges of the narrow bottom cross brace 24 which is not as wide as the depth of the bottom of the battery, as is readily understandable. The tapered fore end portions 30 of the walls 20 and 21 are adapted to extend beyond the front wall of the battery, when the battery is in place upon the bottom 24, as shown in Figure 1, and are apertured at 32 and 33 respectively in aligning relation for receiving a transverse connecting rod 34 of the means C to be subsequently described. The walls 20 and 21 at their rear edges above the convergent edges 27 are provided with right angled outwardly extending attaching flanges 35, which are apertured at 36ª for receiving screws, bolts, or like elements 38 which may be suitably connected with the chassis frame, or any other support upon which the bracket is to be placed for mounting the storage battery.

Figure 4:
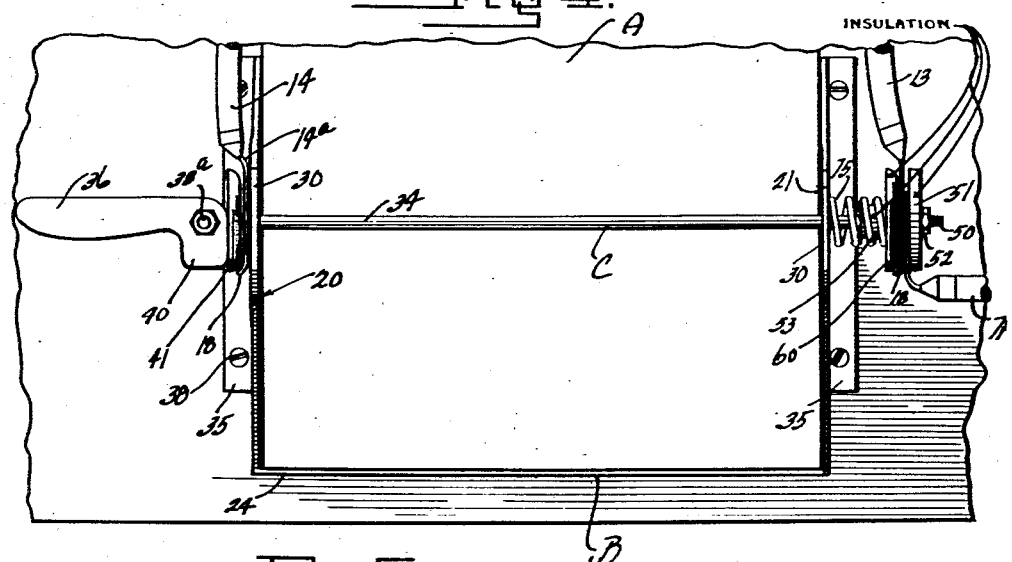
Figure 4 shows the clamp open to facilitate removal of terminals and cable connections.
Figure 5:
Figure 5 is a plan view of the cam operating lever-clamp of the improved device.

Referring to the means C, the same includes the rod 34 above mentioned, which slidably extends through the aligning openings 32 and 33, in preferable abutment with the front surface of the front wall of the storage battery casing 10. The rod 34 at one end is provided with a lever 36, having a slot 37 in the end thereof within which the eye of the rod 34 extends and is pivoted at 38ª therein. The lever 36 has a right angled cam portion or extension 40, transverse to the axis of the handle of the lever, as shown in Figures 3 and 4 of the drawings, which is adapted to operate against a disc-like washer 41 to enable the clamping action to be subsequently mentioned. The cable 14 has its forked terminal 14ª detachably extended between the washer 41 and the outer surface of the extension end 30 of the bracket wall 20, as shown in Figures 3 and 4 of the drawings; the arms 16 and 17 of the forked terminal 14ª straddling the rod 34 and having the ends 18 extending about the convex peripheral edge of the washer 41. The rod 34 at its opposite end is screw threaded, as shown at 50 in Figure 3 of the drawings, and on this screw threaded end there is disposed a fiber insulation disc 51 abutting against an end nut 52; a fiber insulation sleeve 53 being loosely mounted on the threaded end 50 and engaging at one end against the disc 51. At its opposite end, a second nut 54 is threaded on the sleeve 50 against which the sleeve 53 abuts for holding the latter in place against longitudinal movement on the rod 34, as can readily be understood. Slidably mounted upon the insulation sleeve 53 is an insulation washer 60, having an opening therethrough to slidably receive the sleeve 53 therein; the washer 60 being slidable towards and away from the washer 51 for the purpose of clamping the bifurcated terminal 14ª of the cable 13 therebetween, in the same relationship as above mentioned for the terminal of the cable 14; the turned ends 18 of the fingers 16 and 17 of the terminal 14ª of the cable 14 being turned about the convex peripheral edge of the insulation washer 60, as shown in the drawings. The turning of the free ends of the fingers of the terminals 14ª in this relation about the peripheral edges at the opposite side of the rod from that portion of the terminal which straddles said rod, prevents a direct pull of the terminal clips away from the rod 34, and out of their conducting relation with the same, in the case of the cable 14, and out of conducting relation with a conducting terminal portion 70 of a cable 71 leading to the ignition units of the vehicle on which supported, furnishing the line connection; it being understood that the cable 14 furnishes the ground connection for the battery. A spiral spring 75, under compression, is disposed over the sleeve 53, abutting against the washer 60 at one end and against the outer side of the end portion 30 of the wall 21 of the bracket for the battery, at its opposite end.

As shown in Figure 4 of the drawings, the terminals 14ª of the short lengths of cable 13 and 14 are slipped between their respective washers. In this position the cam-like lever 36 has its handle extending in alignment with the axis of the rod 34, and the spring 75 is under no great tension, so that the bifurcated terminals 14ª may be readily slipped into place. However, as soon as the battery A is in its container or bracket construction B, and the terminals of the cables and connecting lines in place, the lever 36 is swung downwardly transverse to the axis of the rod 34. This moves the cam extension end 40 into engagement with the washer 41; shortening the effective length of the rod 34, and placing the spring 75 under compression. The operation also has the effect of clamping those end portions 30 of the bracket walls 20 and 21, which extend beyond the front wall of the battery casing, closer together, moving the walls 20 and 21 into frictional clamping engagement with the opposite end walls of the battery casing 10 to effectively mount the latter in place against play therein. The contraction of the walls 20 and 21 at their extension portions 30 also tends to further clamp the terminals 14ª and the terminal 70 in place between the metal and insulation washers above mentioned.

In order to remove the battery it is merely necessary to swing the handle 36 from the position shown in Figure 3 to the position shown in Figure 4. The walls of the bracket will then be relieved of their spring tension, so that the battery may be readily lifted therefrom, and of course the bifurcated terminals 14ª of the short lengths of cable 13 and 14 may be readily lifted from their position between the clamping washers of the means C. Inasmuch as the free ends or terminals of the cable lengths 13 and 14 are connected and grounded to line connections, at the sides of the battery, spaced from the battery posts, there will be little liability of corrosion, and yet furnishing a positive connection and one which may be readily and quickly detached.

Various changes in the shape, size, and arrangement of parts may be made to the form of invention herein shown and described, without departing from the spirit of the invention or the scope of the claims.

I claim:

1. In battery terminal connecting and supporting apparatus the combination of a battery support, a rod slidably mounted upon the support, a terminal clamp insulated upon the support and rod, a second terminal clamp conductively mounted upon the support and rod, and an operating means for moving the rod selectively to position said clamps in terminal clamping and releasing positions.

2. In battery terminal connecting and supporting apparatus the combination of a battery support, a rod slidably mounted upon the support, a terminal clamp insulated upon the support and rod, a second terminal clamp conductively mounted upon the support and rod, operating means for selectively moving the rod to position said clamps in terminal clamping and releasing positions, and spring means normally acting in conjunction with the rod, support, and clamp to urge the latter into a terminal clamping relation.

3. In combination with a storage battery having the posts thereof conductively provided with relatively movable terminals, a supporting container for the battery casing including spaced walls movable against and away from the battery casing, means connecting said walls for clamping them against the battery casing, said means including relatively insulated clamp devices for receiving the terminals above mentioned in a releasable relation, and a single operating device for operating the last mentioned means for releasing the terminals and battery casing.

4. In battery clamping apparatus a support, a rod slidable upon the support, a pair of clamping devices operatively associated with the support and rod, one of them being conductively related to the rod and the other being insulated with respect to the rod, said clamping devices adapted to receive the opposite terminals of a battery, and an operating handle for moving the rod to selectively clamp and release the terminals with respect to their respective clamp devices.

5. In battery clamping apparatus a support, a rod slidable upon the support, a pair of clamping devices operatively associated with the support and rod, one of them being conductively related to the rod and the other being insulated with respect to the rod, said clamping devices adapted to receive the opposite terminals of a battery, an operating handle for moving the rod to selectively clamp and release the terminals with respect to their respective clamp devices, and a spring operating longitudinally on the rod and normally tending to move the clamp device into a terminal clamping relation.

6. In battery terminal clamping apparatus a pair of spaced members, a rod slidably mounted upon the spaced members, a clamp device insulatively mounted upon the rod adjacent one of said members, the clamp device including a washer associated on the rod against movement and a washer movable on the rod, both of the washers being insulated from the rod, the washers being adapted to receive a terminal therebetween, a spring acting on the movable washer against the adjacent member for moving the movable washer into a terminal clamping relation towards the first mentioned washer, a washer conductively mounted on the rod in a longitudinally slidable relation thereon adjacent the other member for clamping a terminal between the same and said adjacent member, and operating means to selectively hold the rod in terminal clamping and releasing relation.

7. In battery terminal clamping apparatus a pair of spaced members, a rod slidably mounted upon the spaced members, a clamp device insulatively mounted upon the rod adjacent one of said members, the clamp device including a washer associated on the rod against movement and a washer movable on the rod, both of the washers being insulated from the rod, the washers being adapted to receive a terminal therebetween, a spring acting on the movable washer against the adjacent member for moving the movable washer into a terminal clamping relation towards the first mentioned washer, a washer conductively mounted on the rod in a longitudinally slidable relation thereon adjacent the other member for clamping a terminal between the same and its adjacent member, operating means to selectively hold the rod in terminal clamping and releasing relation, said operating means comprising a handle pivoted on an end of the rod adjacent the last mentioned washer and having a cam extension thereon operating against said last mentioned washer.

H. J. LUDEWIG.